(12) United States Patent
Bruno et al.

(10) Patent No.: US 6,976,827 B2
(45) Date of Patent: Dec. 20, 2005

(54) ROTOR BALANCING DEVICE AND METHOD

(75) Inventors: Vittorio Bruno, Mississauga (CA); Jason Araan Fish, Brampton (CA)

(73) Assignee: Pratt & Whitney Canada Corp., Longueuil (CA)

(*) Notice: Subject to any disclaimer, the term of this patent is extended or adjusted under 35 U.S.C. 154(b) by 112 days.

(21) Appl. No.: 10/683,358

(22) Filed: Oct. 14, 2003

(65) Prior Publication Data
US 2005/0244272 A1 Nov. 3, 2005

(51) Int. Cl.⁷ .............................. F01D 11/00
(52) U.S. Cl. ................ 416/144; 754/572; 754/573 R; 754/574
(58) Field of Search ............. 415/111, 112, 174.5, 415/230; 416/144; 74/572, 573 R, 574

(56) References Cited

U.S. PATENT DOCUMENTS

| | | | |
|---|---|---|---|
| 3,074,293 A | | 1/1963 | Langsetmo |
| 3,413,925 A | * | 12/1968 | Campolong ............ 417/357 |
| 3,888,601 A | | 6/1975 | Glassburn |
| 4,177,692 A | | 12/1979 | Irwin |
| 4,294,135 A | | 10/1981 | Tameo |
| 4,477,226 A | | 10/1984 | Carreno |
| 4,667,532 A | * | 5/1987 | Holz et al. ............. 74/573 R |
| 4,803,893 A | | 2/1989 | Bachinski |
| 4,817,455 A | | 4/1989 | Buxe |
| 4,835,827 A | | 6/1989 | Marra |
| 4,856,964 A | | 8/1989 | Stock |
| 4,898,514 A | | 2/1990 | McCracken |
| 4,926,710 A | | 5/1990 | Novotny |
| 4,934,905 A | * | 6/1990 | Richardson, Jr. ........... 417/372 |
| 4,976,585 A | | 12/1990 | Mezzedimi et al. |
| 5,018,943 A | | 5/1991 | Corsmeier et al. |
| 5,167,167 A | | 12/1992 | Tiernan |
| 5,285,700 A | | 2/1994 | Lan |
| 5,336,060 A | | 8/1994 | Tomell et al. |
| 5,478,177 A | | 12/1995 | Romi |
| 5,487,640 A | | 1/1996 | Shaffer |
| 5,810,527 A | | 9/1998 | Jager et al. |
| 5,813,346 A | | 9/1998 | Solomon |
| 6,189,372 B1 | | 2/2001 | Danz |

* cited by examiner

Primary Examiner—Edward K. Look
Assistant Examiner—Devin Hanan
(74) Attorney, Agent, or Firm—Ogilvy Renault LLP (PWC)

(57) ABSTRACT

The present invention includes a rotor assembly comprising a shaft, a first component coaxially attached to the shaft for performing a first function in the rotor assembly and acting as a first counterbalance weight, and a second component coaxially attached to the shaft for performing a second function in the rotor assembly and acting as a second counterbalance weight, whereby the first and second counterbalance weights combine to balance the rotor assembly. The present invention also includes a method of balancing a rotor assembly having a shaft and a residual imbalance, the method comprising the steps of coaxially attaching a first component performing a first function and having a first counterbalance weight integral therewith onto the shaft, and coaxially attaching a second component performing a second function and having a second counterbalance weight integral therewith onto the shaft, so that the first and second components counter the residual imbalance.

26 Claims, 3 Drawing Sheets

ROTOR BALANCING DEVICE AND METHOD

TECHNICAL FIELD

The present invention relates to gas turbine engines, and more particularly to method and apparatus for balancing of rotors of such gas turbine engines.

BACKGROUND OF THE INVENTION

Gas turbine engine rotors require balancing in order to avoid operational problems due to vibrations. Severe vibrations also reduce the effective life of the rotor components.

Generally, the balancing of rotors is done by the addition of discrete balance weights. Such weights are often attached to a carrier serving no other function that to carry the weights. The weights may also be inserted in grooves at the root of rotor blades. The carrier in the first solution provides undesirable extra weight, while the second solution adds stress concentrations in the rotor components due to the grooves and also adds complexity and weight because of the retaining means usually necessary to retain the balance weights.

Balancing can also be done by the removal of material from selected locations. However, direct removal of material from the rotor disk adds stress concentrations to the detriment of the rotor.

Accordingly, there is a need for simple means to balance a rotor assembly without adding unnecessary weight or removing material from components of the rotor assembly.

SUMMARY OF INVENTION

It is therefore an aim of the present invention to provide improved balancing means for a rotor assembly.

Therefore, in accordance with the present invention, there is provided a rotor assembly comprising a rotating shaft, a first annular component coaxially and rotationally attached to the rotating shaft for performing a first function in the rotor assembly, the first annular component also acting as a first counterbalance weight by having an unbalanced weight distribution about the rotating shaft, and a second annular component coaxially and rotationally attached to the rotating shaft for performing a second function in the rotor assembly, the second annular component also acting as a second counterbalance weight by having an unbalanced weight distribution about the rotating shaft, whereby an angular position of the first and second annular components both relative to one another and with respect to the rotating shaft may be selected to effectively combine the first and second counterbalance weights to balance the rotor assembly.

Also in accordance with the present invention, there is provided a device for balancing a rotor assembly comprising first counterbalance means for providing a first imbalance about a rotor assembly shaft, the first counterbalance means being integral with a first component of the rotor assembly, and second counterbalance means for providing a second imbalance about the rotor assembly shaft, the second counterbalance means being integral with a second component of the rotor assembly, whereby the first and second components can be oriented both relative to one another and with respect to the rotor assembly shaft so that the first and second counterbalance means combine to effectively balance the rotor assembly.

Further in accordance with the present invention, there is provided a method of balancing a rotor assembly having a shaft and a residual imbalance about the shaft observed before an installation of a first annular component performing a first function and of a second annular component performing a second function, the method comprising the steps of coaxially attaching the first annular component onto the shaft so that a first counterbalance weight integral with the first annular component counters a portion of the residual imbalance to obtain a reduced residual imbalance, and coaxially attaching the second annular component onto the shaft so that a second counterbalance weight integral with the second annular component counters the reduced residual imbalance.

Also in accordance with the present invention, there is provided a method of providing and balancing a rotor assembly, the method comprising the steps of providing a rotor assembly having at least a rotating shaft and first and second operational components coaxially rotatable with the shaft, the first operational component being provided with a first intentional imbalance about the shaft, and the second operational component being provided with a second intentional imbalance about the shaft, assembling the rotor assembly, and adjusting an angular position of the first and second operational components relative to one another to thereby rotationally balance the rotor assembly about the shaft.

BRIEF DESCRIPTION OF THE DRAWINGS

Having thus generally described the nature of the invention, reference will now be made to the accompanying drawings, showing by way of illustration a preferred embodiment thereof and in which.

DESCRIPTION OF THE PREFERRED EMBODIMENTS

Figure 1:
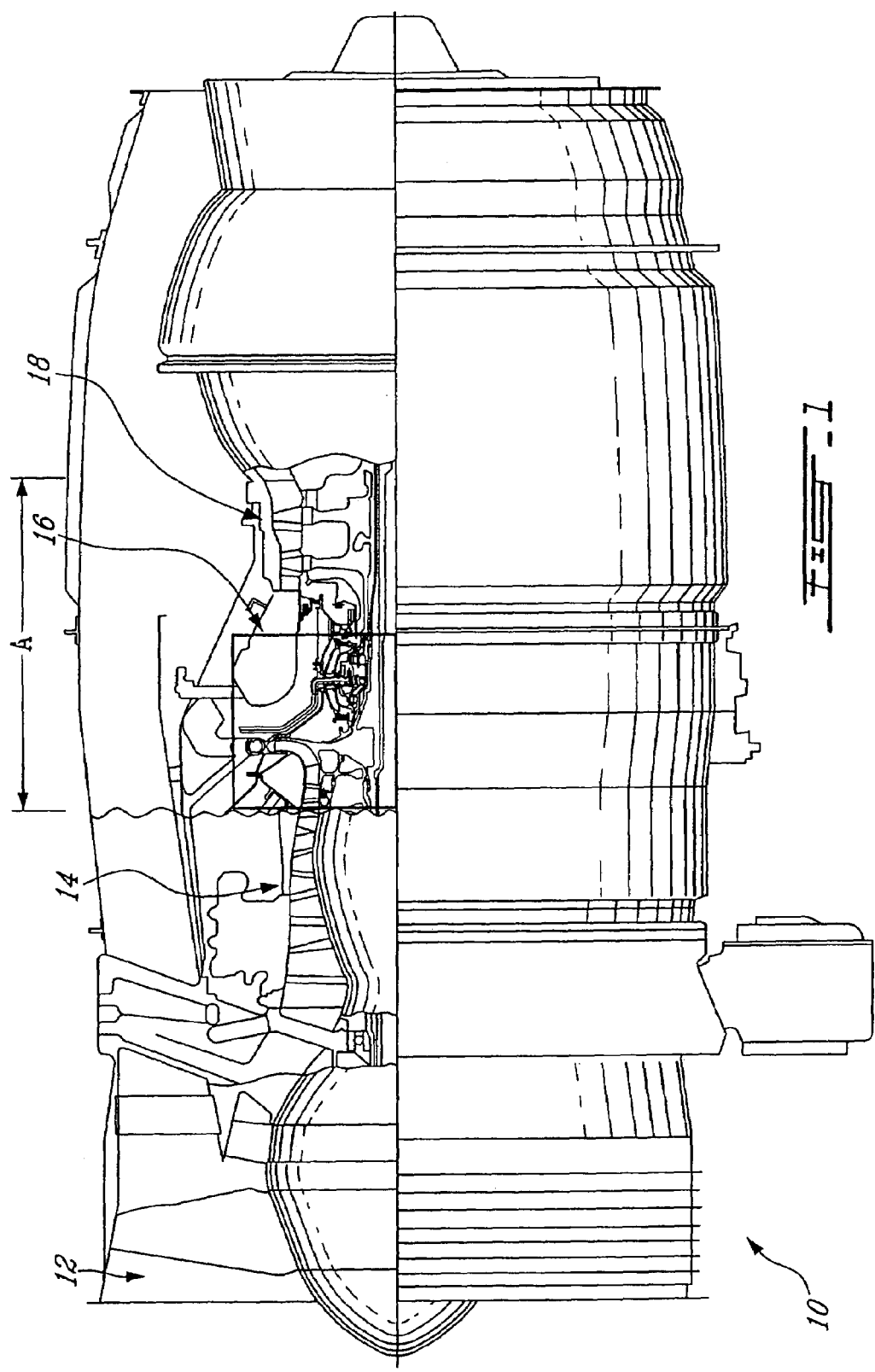
FIG. 1 is a side view of a gas turbine engine, in partial cross-section, exemplary of an embodiment of the present invention.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine 18 for extracting energy from the combustion gases.

Figure 2:
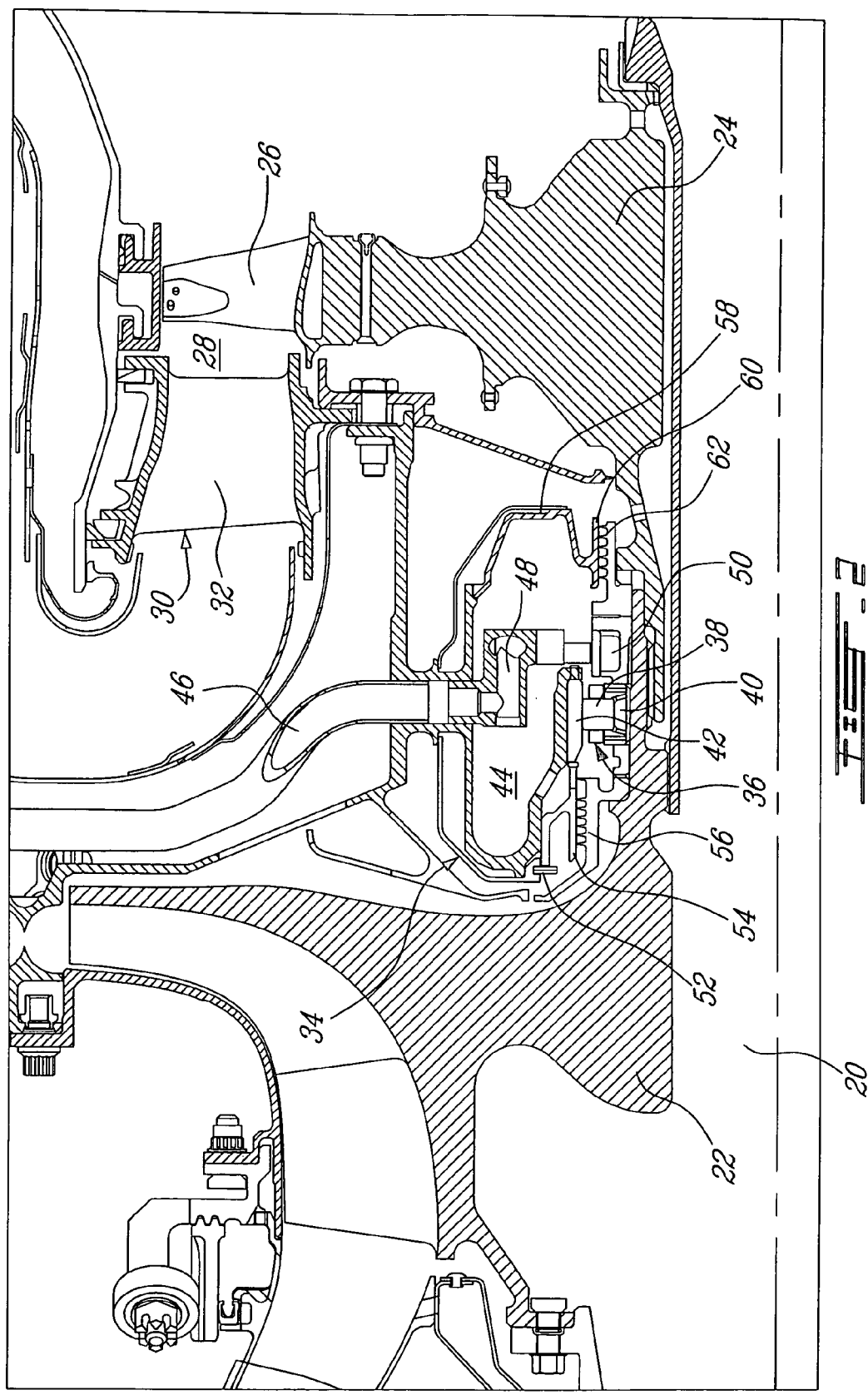
FIG. 2 is an enlarged cross-sectional view of portion A of FIG. 1.

FIG. 2 shows a detail of the engine cross-section. A shaft 20 extends through the gas turbine engine 10. A rotor disk 22 and a turbine disk 24 are rotationally attached to the shaft 20. The turbine disk 24 supports a plurality of circumferentially spaced apart turbine blades 26 extending across a flowpath 28 for working medium gases. A turbine stator 30 is located just upstream of the turbine disk 24. The turbine stator 30 includes a row of circumferentially spaced apart stationary turbine vanes 32.

A bearing housing 34 supports the shaft 20 and is located axially between the impeller disk 22 and turbine disk 24. The bearing housing 34 includes an annular bearing assembly 36 coaxial with the shaft 20. The annular bearing assembly 36 comprises a plurality of circumferentially spaced apart roller bearings 38 sandwiched between an inner bearing race 40 rotationally fixed to the shaft 20 and a stationary outer bearing race 42. The bearing housing 34 also defines an annular oil cavity 44. The annular bearing assembly 36 is arranged so that the roller bearings 38 are located inside the annular oil cavity 44. The bearing housing also includes a port 46 for oil to enter the annular oil cavity 44. The port 46 is in fluid connection with an oil channel 48 which, during engine operation, sprays oil at an oil scoop 50. The function of the oil scoop 50 is to deliver oil to the roller bearings 38. The bearing housing 34 also comprises a front cover 52 including a land 54 contacting a front seal runner 56 to form a sealed joint. Similarly, the bearing housing 34 also comprises a rear cover 58 including a land 60 contacting a rear seal runner 62 to form a second sealed joint. The rear seal runner partially overlaps the oil scoop 50 in a sealing manner, and both components are press fit onto the shaft 20.

Figure 3:
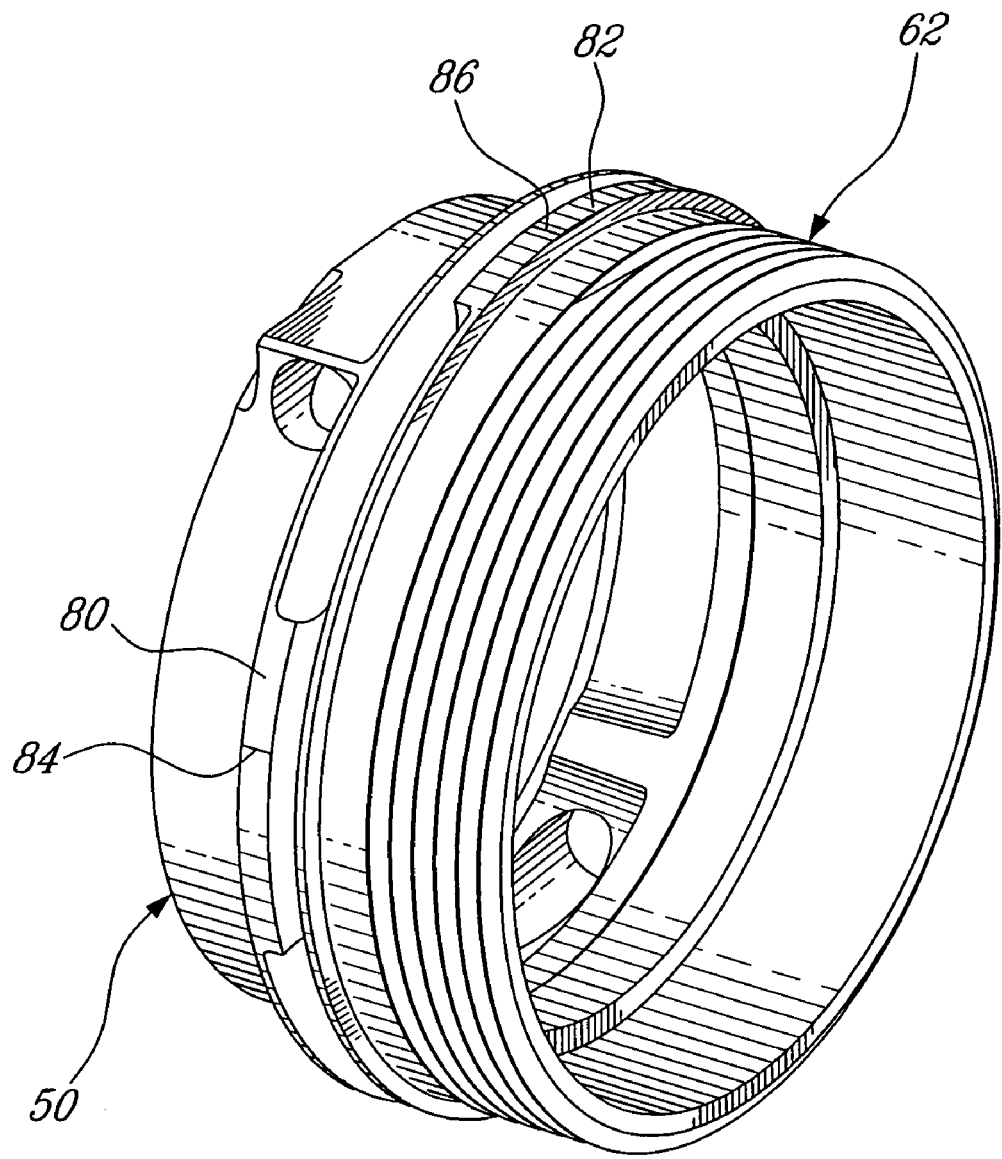
FIG. 3 is a perspective view of a balancing device according to an embodiment of the present invention.

In a preferred embodiment of the present invention, the oil scoop 50 is machined with an integral counterbalance weight 80 in the form of a flange at a periphery thereof, as shown in FIG. 3. Similarly, the rear seal runner 62 is machined with an integral counterbalance weight 82 in the form of a flange at a periphery thereof. The two counterbalance weights 80,82 are preferably of equivalent mass in order to simplify the balancing process. Preferably, the counterbalance weights 80,82 each include a permanent mark 84,86 indicating a center of mass thereof. These marks 84,86 can be made by mechanical etching when the oil scoop 50 and rear seal runner 62 are manufactured.

By combining the counterbalance weights 80,82 of the oil scoop 50 and rear seal runner 62, a balancing force can be generated, the intensity of the balancing force being determined by a relative angular position between the two counterbalance weights 80,82. The balancing force generated varies from zero (when the two counterbalance weights 80,82 are diametrically opposed for counterbalance weights of similar mass), to the sum of the counterbalance weights when the two counterbalance weights 80,82 are aligned.

It is also considered to use integral counterbalance weights of any other appropriate shape. The counterbalance weights can also be provided by machining the oil scoop 50 and rear seal runner 62 with an eccentric bore so as to offset their center of mass.

The rotor assembly can be balanced using the present invention in the following manner. Before an installation of the oil scoop 50 and rear seal runner 62, a residual imbalance of the remainder of the rotor assembly is determined in the manner already known in the art. A point of maximum imbalance on the shaft 20 is determined and a required balancing force is computed. A mark, preferably non-permanent, is made on the shaft 20 at a point diametrically opposite to the point of maximum imbalance. Using a simple computer program, chart or formula, a relative angular position required between the counterbalance weights 80,82 to generate the required balancing force is computed. The oil scoop 50 and rear seal runner 62 are then press fit to the shaft 20 so that the marks 54,86 are spaced apart with the relative angular position computed such that the shaft mark is angularly centered between the two counterbalance weights marks 84,86.

If the rotor assembly later becomes unbalanced due, for example, to wear, the oil scoop 50 and rear seal runner 62 can be removed and the above-described procedure repeated in order to rebalance the rotor assembly.

Since no extra components are needed for balancing the rotor assembly, the balancing process is simplified. The invention also minimizes weight addition required for balancing the rotor assembly since the balancing components, i.e. oil scoop 50 and rear seal runner 62, are components already present in the rotor assembly. No secondary attachment feature is required for balancing the rotor assembly since the balancing components are press fit onto the shaft 20.

It is understood that a number of other existing components in the rotor assembly can be similarly machined with an integral counterbalance weight instead, or with, the oil scoop 50 and rear seal runner 56. In particular, any pair of annular components located on the rotor shaft can be machined to contain counterbalance weights similar to the preferred embodiment described.

The embodiments of the invention described above are intended to be exemplary. Those skilled in the art will therefore appreciate that the forgoing description is illustrative only, and that various alternatives and modifications can be devised without departing from the spirit of the present invention. Accordingly, the present invention is intended to embrace all such alternatives, modifications and variances which fall within the scope of the appended claims.

We claim:

1. A device for balancing a rotor assembly comprising:
   a first counterbalance weight for providing a first imbalance about a rotor assembly shaft, the first counterbalance weight being integral with a first operational component of the rotor assembly; and
   a second counterbalance weight for providing a second imbalance about the rotor assembly shaft, the second counterbalance means being integral with a second operational component of the rotor assembly;
   whereby the first and second operational components can be oriented both relative to one another and with respect to the rotor assembly shaft so that the first and second counterbalance means combine to effectively balance the rotor assembly.

2. The device according to claim 1, wherein the first operational component is an oil scoop adapted to deliver lubricant to other components of the rotor assembly.

3. The device according to claim 2, wherein the first counterbalance weight integral with the oil scoop is a flange at a periphery thereof.

4. The device according to claim 1, wherein the second operational component is a seal runner adapted to seal a lubricant-receiving cavity of the rotor assembly.

5. The device according to claim 4, wherein the second counterbalance weight integral with the seal runner is a flange at a periphery thereof.

6. The device according to claim 1, wherein the first operational component is an oil scoop and the second operational component is a seal runner.

7. The device according to claim 1, the device further comprising a first mark on the first operational component, a second mark on the second operational component, and a third mark on the shaft, the first, second and third marks being used as references to orient the first and second annular operational components.

8. A method of balancing a rotor assembly having a shaft and a residual imbalance about the shaft observed before an installation of a first annular operational component performing a first function and of a second annular operational component performing a second function, the method comprising the steps of:
   a) coaxially attaching the first annular operational component onto the shaft so that a first counterbalance weight integral with the first annular operational component counters a portion of the residual imbalance to obtain a reduced residual imbalance; and b) coaxially attaching the second annular operational component onto the shaft so that a second counterbalance weight integral with the second annular operational component counters the reduced residual imbalance.

9. The method of balancing a rotor assembly according to claim 8, wherein before step a) the method further comprises a step of calculating a relative angular position between the first and second counterbalance weights necessary to produce a balancing force required to counter the residual imbalance, and during steps a) and b), the first and second annular operational components are positioned such that the first and second counterbalance weights are at the relative angular position calculated.

10. The method of balancing a rotor assembly according to claim 9, wherein the first counterbalance weight comprises a first mark indicating a center of mass thereof, and the second counterbalance weight comprises a second mark indicating a center of mass thereof, and during steps a) and b), the first and second annular operational components are positioned such that the first and second marks are at the relative angular position calculated.

11. The method of balancing a rotor assembly according to claim 10, wherein the first and second counterbalance weights have a similar mass, before step a) the method further comprises a step of indicating a third mark on the shaft at a point diametrically opposite of a point of maximum imbalance thereof, and during steps a) and b) the first and second annular operational components are positioned such as to have the third mark angularly centered between the first and second marks.

12. The method of balancing a rotor assembly according to claim 8, wherein the first annular operational component is an oil scoop and the first function is the delivery of lubricant to other components of the rotor assembly.

13. The method of balancing a rotor assembly according to claim 12, wherein the first counterbalance weight integral with the oil scoop is a flange at a periphery thereof.

14. The method of balancing a rotor assembly according to claim 8, wherein the second annular operational component is a seal runner and the second function is the sealing of a lubricant-receiving cavity of the rotor assembly.

15. The method of balancing a rotor assembly according to claim 14, wherein the second counterbalance weight integral with the seal runner is a flange at a periphery thereof.

16. The method of balancing a rotor assembly according to claim 8, wherein the first annular operational component is an oil scoop and the second annular operational component is a seal runner.

17. The method of balancing a rotor assembly according to claim 8, wherein the method further comprises at least one of during step a) the first annular operational component is press fit onto the shaft and during step b) the second annular operational component is press fit onto the shaft.

18. A method of providing and balancing a rotor assembly, the method comprising the steps of:
a) providing a rotor assembly having at least a rotating shaft and first and second operational components coaxially rotatable with the shaft, the first operational component being provided with a first intentional imbalance about the shaft, and the second operational component being provided with a second intentional imbalance about the shaft;
b) assembling the rotor assembly; and
c) adjusting an angular position of the first and second operational components relative to one another to thereby rotationally balance the rotor assembly about the shaft.

19. The method according to claim 18, wherein before step c) an imbalance of the rotor assembly about the rotating shaft is measured and the angular position of step c) is chosen such as to produce a balancing force required to counter the imbalance of the rotor assembly.

20. The method according to claim 19, wherein the first intentional imbalance comprises a first mark indicating a center of mass thereof, the second intentional imbalance comprises a second mark indicating a center of mass thereof, and during step c) the first and second operational components are positioned such that the first and second marks are at the relative angular position chosen.

21. The method according to claim 20, wherein the first and second intentional imbalances have a similar mass, before step c) a third mark is indicated on the rotating shaft at a point diametrically opposite of a point of maximum imbalance thereof, and during step c) the first and second operational components are positioned such as to have the third mark angularly centered between the first and second marks.

22. The method according to claim 18, wherein the first operational component is an oil scoop adapted to deliver lubricant to other components of the rotor assembly.

23. The method according to claim 22, wherein the first intentional imbalance is a flange at a periphery of the oil scoop.

24. The method according to claim 18, wherein the second operational component is a seal runner adapted to seal a lubricant-receiving cavity of the rotor assembly.

25. The method according to claim 24, wherein the second intentional imbalance is a flange at a periphery of the seal runner.

26. The method of balancing a rotor assembly according to claim 18, wherein the first operational component is an oil scoop and the second operational component is a seal runner.

* * * * *